Dec. 22, 1931.  J. H. HACKLEY  1,837,264
METHOD OF DISINFECTING INCUBATORS
Filed April 16, 1928
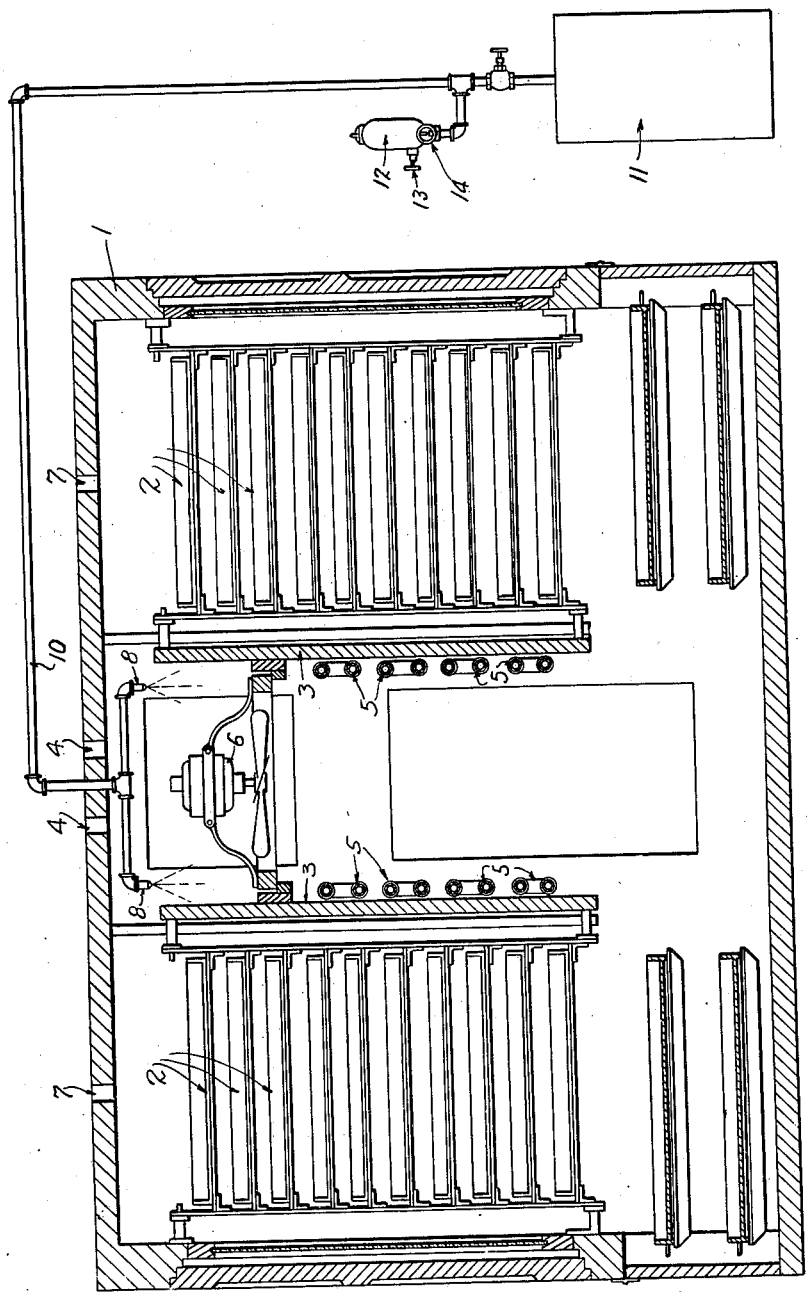
Inventor
John H. Hackley
By Staley & Wilch
Attorneys Patented Dec. 22, 1931

1,837,264

UNITED STATES PATENT OFFICE

JOHN H. HACKLEY, OF CHERRYVALE, KANSAS

METHOD OF DISINFECTING INCUBATORS

Application filed April 16, 1928. Serial No. 270,265.

This invention relates to a method and system of disinfecting incubators, particularly that class of incubators in which the air in the incubating chamber is kept in motion either mechanically or by an inherent natural draft due to the passage through the chamber of air in a heated condition.

An important source of loss to the hatch in the hatching of chicks in incubators is due to disease germs which find their way into the incubating chamber through the medium of infected eggs, particularly in incubators in which the air is circulated by a fan or otherwise over the eggs in the process of incubation. These germs are found on the interior of the eggs as well as the exterior so that the germs are not only carried throughout the incubating chamber from the unhatched eggs but also from the hatched eggs and by the down from diseased chicks after hatching. One of these diseases is bacillary white diarrhea, or pullorum disease, and is transmitted to healthy chicks from chicks which have it as a matter of heredity from the parent stock through the contents of the egg. In order to effectively safeguard against the spread of disease therefore to the newly hatched chicks it becomes desirable to periodically disinfect the eggs after they have been placed in the incubator and while they are in the process of incubation including the hatching stage and this must be done in a way not harmful to the eggs or the chicks either from the disinfectant or by disturbing for any considerable period the conditions of temperature and air necessary to successful hatching.

I have discovered that a disinfectant can be introduced into an incubator while in operation without harm to the hatch if a comparatively high degree of humidity is maintained and if the disinfectant is distributed uniformly throughout the incubating chamber by a forced circulation of air.
The object of the invention is to provide a method and system for the disinfecting of incubators which will be simple and effective for rendering diseased germs inactive without harm to the eggs or chicks in the process of incubation.

A further and more specific object of the invention is to provide for injecting into the incubator a mixture of disinfectant and moisture which will be carried by forced currents of air throughout the incubating chamber without materially disturbing the conditions of temperature or other necessary conditions incidental to proper incubation including hatching.

In the accompanying drawing, the figure is a vertical section of an incubator showing my improved method and system.

The invention is particularly applicable to an incubator of the so-called mammoth type in which a circulation of air therethrough is induced by a fan. The incubator chamber is indicated at 1, and 2 represents egg trays which are in the present case arranged in two vertical series in hatching compartments with a central corridor therebetween formed by the division walls 3. Fresh air is admitted through a series of restricted inlets 4 in the ceiling of the chamber, this air being circulated downwardly through the central corridor over a heater in the form of coils of pipe 5 and thence upwardly over the egg trays in the hatching compartments by an electric fan 6, foul air being permitted to escape through a series of restricted outlets 7; the major portion of the air being continuously circulated in this manner as is the common practice in this type of incubator.

To carry out my method and system of disinfecting the apparatus, I locate in the incubating chamber preferably between the air inlets 4 and the fan an injection device shown in the present case as two spray nozzles 8 which are connected to a pipe 10 which leads to a source of moisture supply under pressure. In the present case I have shown this source of moisture supply as a steam boiler 11 which is preferably the boiler which supplies steam to the coils 5 although where hot water is used to heat the incubator the supply of moisture will be taken from the hot water heater and a suitable pump employed to create a pressure. The disinfectant is placed in a small container 12 which is connected with the pipe 10, a valve 13 being provided to regulate the supply. This container is preferably provided with a drop sight feed 14 of well known construction so that the amount of disinfectant supplied may be regulated.

A disinfectant which I have found effective is formalin, which is a water solution of formaldehyde gas, and the mixture of disinfectant and moisture is sprayed into the incubating chamber preferably in the proportion of one part disinfectant to two parts moisture. The quantity of disinfectant which I have found effective is substantially 500 cc. of formalin to a chamber of substantially 850 cubic feet capacity, although these exact proportions can be varied with good results.

In spraying the disinfectant, the air is circulated in the normal way with the air intake and outlets open and it has been found that an incubator can in a very short time be thoroughly disinfected in this manner without harm to the eggs in the process of incubation or to the chicks being hatched.

By the method described it has been found possible to effectively disinfect an incubator without harm to the hatch, it having been discovered that the introduction of the disinfectant in substantially the proportion described, together with moisture to an extent that will materially increase the humidity of the incubating chamber, if a low humidity should exist, by a continuously moving forced circulation of air, acts to cause an even distribution or absorption of the disinfectant throughout the structure as well as over the entire bodies of the chicks, as the disinfectant employed has a pronounced affinity for moisture.

For best results the machine should not be disturbed for a period of one and one-half hours after the disinfectant has been introduced but if it becomes necessary to enter the chamber shortly after the introduction of the disinfectant a neutralizing agent such as ammonia water is introduced in any suitable manner.

While I have described the introduction into the air currents of the incubating chamber of formaldehyde gas in the formalin I do not desire to be limited to the exact method of introducing the gas nor to the exact proportion specified.

Having thus described my invention, I claim:

1. The method of disinfecting an incubator during the operation of hatching eggs for the purpose of destroying disease germs without harm to the hatch consisting in creating a forced circulation of air in the incubating chamber, introducing moisture to the air currents to impart thereto a higher degree of humidity than possessed by outside atmosphere, and introducing formaldehyde to the air currents.

2. The method of disinfecting an incubator during the operation of hatching eggs for the purpose of destroying disease germs without harm to the hatch consisting in creating a forced circulation of air in the incubating chamber, introducing moisture into the chamber to provide a comparatively high degree of humidity, and introducing formaldehyde to the air currents.

In testimony where, I have hereunto set my hand this twenty-eighth day of March, 1928.

JOHN H. HACKLEY.